(12) United States Patent
Porde et al.

(10) Patent No.: US 11,852,219 B2
(45) Date of Patent: Dec. 26, 2023

(54) LINEAR DRIVE WITH POSITIONAL ORIENTATION MEANS BETWEEN GUIDE TUBE AND SPINDLE NUT

(71) Applicant: DewertOkin KFT, Kecskemét (HU)

(72) Inventors: Christoph Porde, Kecskemét (HU); Zoltán Varga, Kiskunfélegyháza (HU)

(73) Assignee: DewertOkin KFT, Kecskemét (HU)

( * ) Notice: Subject to any disclaimer, the term of this patent is extended or adjusted under 35 U.S.C. 154(b) by 0 days.

(21) Appl. No.: 17/596,691

(22) PCT Filed: Jun. 10, 2020

(86) PCT No.: PCT/EP2020/066123
§ 371 (c)(1),
(2) Date: Dec. 16, 2021

(87) PCT Pub. No.: WO2020/254172
PCT Pub. Date: Dec. 24, 2020

(65) Prior Publication Data
US 2022/0316566 A1 Oct. 6, 2022

(30) Foreign Application Priority Data

Jun. 17, 2019 (DE) ..................... 20 2019 103 390.8
Dec. 17, 2019 (DE) ..................... 10 2019 134 755.6

(51) Int. Cl.
*F16H 25/24* (2006.01)
*F16H 25/20* (2006.01)

(52) U.S. Cl.
CPC ....... *F16H 25/24* (2013.01); *F16H 2025/209* (2013.01); *F16H 2025/2031* (2013.01); *F16H 2025/2084* (2013.01)

(58) Field of Classification Search
CPC .............. F16H 25/24; F16H 2025/249; F16H 2025/2481; F16H 2025/209; F16H 2025/2037; H01K 7/081; H02K 7/06
See application file for complete search history.

(56) References Cited

U.S. PATENT DOCUMENTS 4,739,669 A * 4/1988 Yokose .................. B23Q 5/404
74/89.36
5,560,251 A * 10/1996 Babinski ............. F16H 25/2204
74/424.86
(Continued)

FOREIGN PATENT DOCUMENTS

DE 102013003830 11/2014
DE 202013105249 4/2015
(Continued)

OTHER PUBLICATIONS

International Search Report from corresponding PCT Appln. No. PCT/EP2020/066123, dated Oct. 12, 2020.
(Continued)

*Primary Examiner* — Victor L Macarthur
(74) *Attorney, Agent, or Firm* — Grossman, Tucker, Perreault & Pfleger, PLLC

(57) ABSTRACT

A linear drive comprising a transmission housing and an electric motor which is connected thereto and which drives a mounted shaft which in turn drives a worm which meshes with a worm gear which is non-rotatably connected to a spindle on which runs a spindle nut, arranged displaceably in a guide tube. Provided between the guide tube and the spindle nut to ensure correct rotary angle orientation of the spindle nut, in relation to the guide tube are inner barsa and complementary guide grooves. To simplify machine-assisted mounting of the spindle nut, in the guide tube there are provided positional orientation means which implement (Continued)

correct rotary angle orientation of the spindle nut, upon insertion thereof into the guide tube in the push-in direction.

11 Claims, 10 Drawing Sheets

(56) References Cited

U.S. PATENT DOCUMENTS

| | | | |
|---|---|---|---|
| 6,315,451 B1 * | 11/2001 | Michioka | F16H 25/20 384/42 |
| 10,119,599 B2 | 11/2018 | Fischer et al. | |
| 10,604,133 B2 | 3/2020 | Deberling et al. | |
| 2014/0312725 A1 | 10/2014 | Oberndorfer | |
| 2016/0215870 A1 * | 7/2016 | Chakkera | F16H 57/0497 |
| 2017/0184187 A1 | 6/2017 | Tseng | |
| 2018/0180144 A1 * | 6/2018 | Legrand | F16H 25/2025 |
| 2018/0216390 A1 * | 8/2018 | Takizawa | F16H 1/32 |
| 2018/0345934 A1 * | 12/2018 | Weh | F04B 17/03 |
| 2018/0355958 A1 | 12/2018 | Graham | |
| 2019/0346028 A1 * | 11/2019 | Ohkawa | F16H 25/2006 |
| 2020/0008991 A1 * | 1/2020 | Wu | F16F 9/103 |
| 2020/0346703 A1 * | 11/2020 | Quenzer | B62J 1/08 |
| 2020/0355248 A1 * | 11/2020 | Fisher | F16H 25/2247 |
| 2021/0364069 A1 * | 11/2021 | DeYoung | F16H 25/2409 |
| 2022/0316566 A1 * | 10/2022 | Porde | F16H 37/02 |

FOREIGN PATENT DOCUMENTS

| | | |
|---|---|---|
| DE | 202016106361 | 3/2018 |
| DE | 202019103390.8 | 10/2020 |
| DE | 102019134755 | 12/2020 |
| WO | 2013068329 | 5/2013 |
| WO | 2017045796 | 3/2017 |

OTHER PUBLICATIONS

International Preliminary Report on Patentabiliity from corresponding PCT Appln. No. PCT/EP2020/066123, dated Dec. 30, 2021.

* cited by examiner

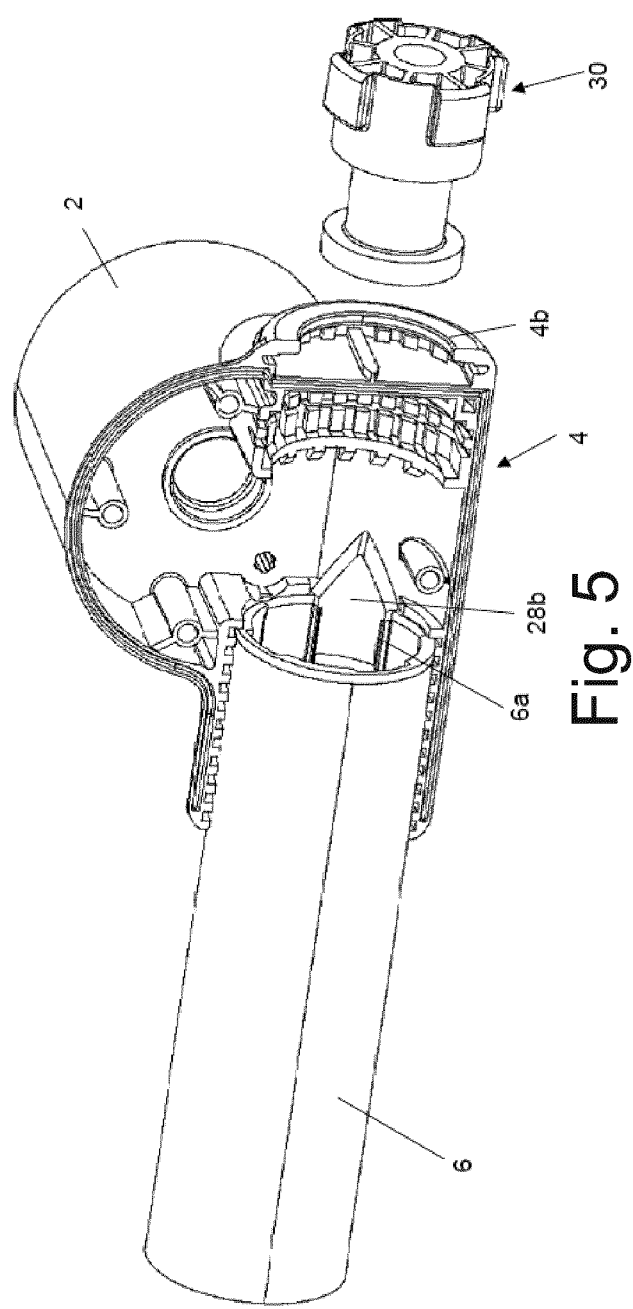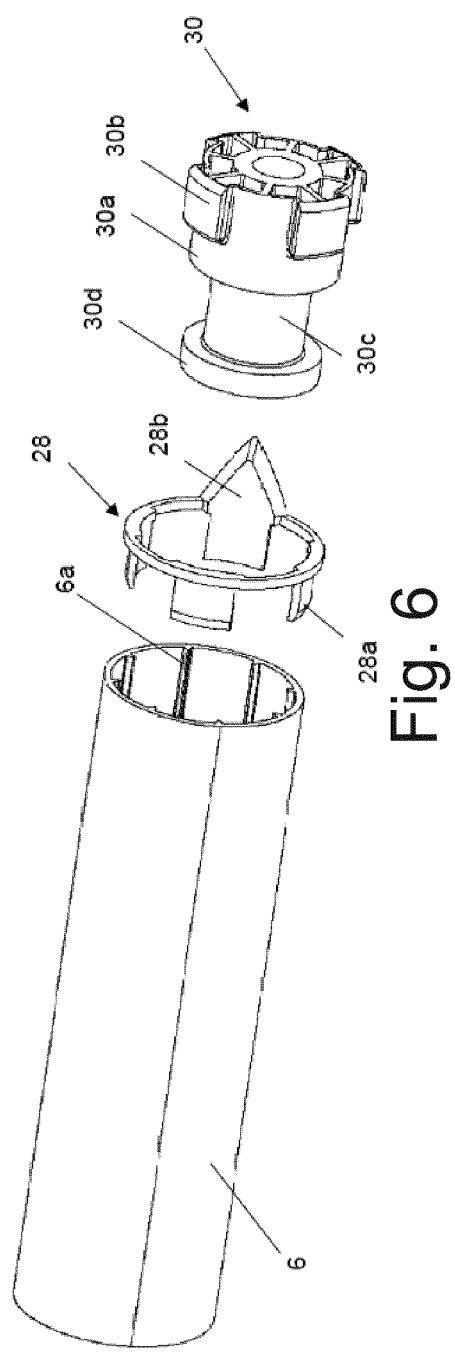

LINEAR DRIVE WITH POSITIONAL ORIENTATION MEANS BETWEEN GUIDE TUBE AND SPINDLE NUT

FIELD

The invention concerns a linear transmission or a linear drive having a transmission housing, an electric motor which is or can be connected to the transmission housing and which drives by way of a rotor a mounted shaft which is mounted on a rear shaft end in a rear shaft bearing and is mounted on a front shaft end, wherein current transmission to the rotor is effected by way of a commutator, wherein the shaft drives a worm which in turn meshes with a worm gear which in turn is non-rotatably connected to a spindle on which there runs a spindle nut which is held non-rotatably and axially displaceably in a guide tube and is displaceable along the longitudinal axis thereof, and wherein the spindle nut is connected to a lift tube.

BACKGROUND

A linear drive of that kind is preferably used for the automatic adjustment of moveably mounted parts of lying and seating furniture, that is to say furniture items.

A linear drive of the general kind set forth is known from WO 2013/068329 to the present applicant.

In the state of the art therefore the electric motor drives a worm gear having a female thread into which a threaded spindle is screwed. A spindle nut runs on the threaded spindle, the nut being non-rotatably secured in the guide tube by way of guide means and being relatively displaceable with respect to the stationary guide tube, between an extended extension position and a retraction position of being retracted into the guide tube. The extension and retraction positions can normally be determined or adjusted by way of limit switches.

For non-rotatably securing the spindle nut the outer hollow-cylindrical guide tube at the inner peripheral surface has projections or guide ribs or the like which extend in the longitudinal direction and project radially inwardly and which externally engage into guide grooves correspondingly provided at the outer peripheral surface of the spindle nut and thus ensure the correct angular or rotary angular orientation of the spindle nut about the longitudinal axis in relation to the guide tube. Preferably the spindle nut has a plurality of radially outwardly projecting peripherally mutually spaced guide grooves into which in the installation position there engage corresponding peripherally mutually spaced, radially inwardly projecting inner ribs or inner bars on the guide tube. The radially inwardly projecting inner bars are sometimes also referred to as flanges, and for that reason that non-rotational arrangement or linear guide for the spindle nut in the stationary guide tube is also referred to as "flange guide".

DISADVANTAGES IN THE STATE OF THE ART

The incorrect angular orientation or rotary angular orientation of the spindle nut about the longitudinal axis relative to the guide tube can delay insertion of the spindle nut into the guide tube because for example with incorrect orientation of the rotary angle of the spindle nut about the central longitudinal axis of the spindle or the spindle nut an intermediate bar or another component of the spindle nut can strike against an inner bar of the guide tube so that the spindle nut has to be rotated about the longitudinal axis in order to achieve the correct arrangement of the spindle nut in the guide tube and then once again insert it into the guide tube.

The terms "rotary angle" or "angular orientation" refer in accordance with this invention therefore to rotation about the longitudinal axis of the spindle and/or the spindle nut.

TECHNICAL PROBLEM/OBJECT

Taking the above-indicated state of the art and the disadvantages linked thereto as the basic starting point therefore the object of the invention is to at least partially avoid the disadvantages mentioned and in particular to provide a linear drive which permits faster and easier assembly of the spindle nut within the guide tube and thus reduces the cycle times in assembly of the linear drive.

SUMMARY

According to the invention that is already achieved in a linear drive of the kind set forth in the opening part of this specification by the features of the independent claims. Preferred but not necessary features are recited in the appendant claims.

In the simplest configuration the technical problem or the object of the invention is attained in that provided between the joining partners are positional orientation means which provide for correct rotary angle orientation of the spindle nut in relation to the guide tube.

The positional orientation means are preferably so designed upon assembly of the joining partners at the joining location or joining plane, to produce rotation of the moveable joining partner about the longitudinal axis, in order therefore to independently implement the correct orientation within the respective other joining partner. Preferably the guide tube represents the stationary immobile joining partner and the spindle nut represents the joining partner which is moved or which is rotatable about the longitudinal axis.

Preferably the positional orientation means include at least two mutually spaced insertion profiles which are formed at at least the front end substantially as ship profiles. Those insertion profiles which are in the form of ship profiles each have a front edge or insertion edge which projects radially from a surface and from which lateral insertion surfaces extend rearwardly, similarly to the bow of a ship. At least two mutually adjoining insertion profiles form between each other a guide groove or transition into a guide groove.

The terms front end and rear end or front and rear refer to the joining direction or the direction of insertion of the joining partners.

The insertion profiles therefore substantially involve a geometry similarly to the bow of ship (ship profiles), wherein the front edge extending outwardly radially from a surface extend the insertion surfaces respectively laterally adjoining that front edge rearwardly, that is to say in opposite relationship to the insertion direction as far as the respective guide grooves. A ship profile therefore has two surfaces extending from the front edge rearwardly to guide grooves adjoining each other at the peripheral surface, those surfaces preferably being of identical geometry and particularly preferably rectangular.

Upon cooperation of the joining partners the inner bars or guide bars slide upon contact at the insertion surfaces and because of the inclined configuration of the insertion surfaces in relation to the radially inwardly projecting inner bars which butt against same slide the moveable joining partner as far as the inner bar or inner bars into the guide groove provided between two adjoining ship profiles and are thus correctly oriented in relation to each other and are guided axially.

Admittedly the desired orientation of the spindle nut can already be achieved if there are provided only two mutually juxtaposed insertion profiles having guide grooves respectively formed between two adjoining insertion profiles, but it is advantageous for faster orientation if a plurality of such insertion profiles are provided in juxtaposed relationship on a joining partner.

Preferably the insertion profiles are formed peripherally on an outer peripheral surface of the spindle nut, and preferably they rise in a ship shape from that outer peripheral surface radially outwardly, wherein individual ship profiles are provided symmetrically arranged in mutually adjoining relationship peripherally on the peripheral surface, with guide grooves respectively formed between two adjoining ship profiles.

Preferably provided adjoining the front ship profile portions is a linear region forming the guide groove between two mutually adjoining ship profiles. The term linear is used here to denote a straight region for forming the guide groove between two mutually adjoining ship profiles, that therefore represents the guide groove.

A plurality of mutually juxtaposed ship profiles therefore represent a ship arrangement.

In a plan view the ship profiles therefore exhibit substantially the geometry of an isosceles triangle at least at a front insertion region, wherein the insertion surfaces extend from the front edge in an isosceles configuration to the guide grooves formed at both sides by the respective ship profiles.

Preferably the insertion surfaces are substantially straight, but can also be curved or arched, for example being convex or concave.

To simplify insertion, that is to say for orientation of the joining partners in relation to each other, it has proven to be desirable if the insertion profiles are inclined in opposite relationship to the push-in direction upwardly extending rearwardly so that the front edge represents a rearwardly inclined edge which promotes insertion or introduction of the inserted joining partner into the receiving joining partner.

Particularly preferably the insertion profiles or ship profiles are formed peripherally on a cylindrical peripheral surface of the spindle nut. In that respect it can certainly be provided that the spindle nut is longer than the insertion profile, the insertion profiles can therefore be formed at a preferably rear insertion portion and then at the end form the transition into the guide grooves. It is also possible to form in front of that insertion portion an additional central threaded portion or threaded connecting piece for receiving the spindle.

It is in accordance with the invention that the insertion profiles are formed at the inner wall of the transmission housing adjoining the end of the guide tube, that projects into the transmission housing, so that a spindle nut which is inserted into the guide tube by an automatic machine, robot or the like is correctly oriented by the insertion profiles provided internally on the housing, that is to say the radially inwardly projecting inner bars at the inside of the guide tube engage into the guide grooves of the spindle nut.

Preferably the insertion profiles are provided in one piece on the respective joining partner, preferably being formed in one piece thereon, in particular at the outer peripheral surface of the spindle nut or the transmission housing or also at the inside of the guide tube if the guide bars are provided on the spindle nut.

It is however basically also in accordance with the invention if the insertion profiles are adapted to be connectable to the respective joining partner, for example being adapted to be fitted on to or fitted into same. That can be effected for example when the insertion profiles are on the spindle nut, by the insertion profiles being provided on a fitment or attachment ring which can be connected to the spindle nut, for example it can be connected to the spindle nut by snapping engagement thereon or latching engagement therein. Subsequent arrangement of the insertion profiles on the transmission housing is also possible, for example the insertion profiles can be internally fitted on to the transmission housing.

The connectable design configuration can include for example an attachment ring which can be fitted on to the rear end of the guide tube, that projects into the transmission housing. In the installation position therefore the attachment ring bears with a ring surface against the outer end face of the guide tube. At least one insertion bar extends from the attachment plane defined by that attachment ring, which insertion bar can be inserted into the guide tube and in the installed position engages between two adjoining, radially inwardly projecting inner bars within the guide tube. In the opposite direction to said at least one insertion bar there is also at least one ship profile extending transversely relative to the attachment plane of the attachment ring and engaging into complementary guide structures upon insertion of the spindle nut at the outside thereof. Preferably there are provided a plurality of ship profiles.

That guide structure at the outside of the spindle nut preferably includes wider outer bars or outer ribs, between which the ship profile engages upon being assembled and which fitted into the guide tube engage between two adjoining, inwardly projecting inner bars at the inside of the guide tube.

The configuration according to the invention is particularly advantageous in particular for automated or partially automated assembly, if therefore the spindle nut is fitted into the guide tube by means of a robot or an automatic machine. The self-adjusting configuration afforded in accordance with the invention means that the robot or automatic machine does not have to be trained in a complicated procedure. Rather the correct rotary angle orientation of the joining partners when the joining partners are fitted into each other is implemented automatically by the configuration according to the invention of the joining partners. A further option afforded by the invention even affords providing the insertion profiles on the robot or automatic machine.

Preferably the transmission housing is divisible and besides the first housing portion includes a second housing portion which can be connected to that first housing portion and which for example is in the form of a removable housing cover.

In the preferred embodiment the motor housing can be fitted into the transmission housing.

Embodiments include a flange region being provided between the housing portions, with a sealing tongue-and-groove connection. The proposed linear drive is preferably used as a furniture drive, particularly preferably for adjusting a pivotable head or foot portion of a patient or hospital bed. The man skilled in the art will appreciate that this can be used generally for adjustment of mechanical devices of any kind, in particular for adjustment of a moveable component in relation to a stationary component.

In the context of assembly firstly the worm gear is fitted on to the rear end of the spindle and a ball bearing is fitted on to a rear bearing seat of the worm gear. The spindle nut is then connected to the lift tube with the front fork head and fitted into the guide tube. Finally the two assemblies are connected together, fitted into the transmission housing and the latter is closed.

According to the invention therefore only one bearing is necessary for mounting the spindle with the worm gear in the transmission housing, namely the bearing arranged on the rear bearing seat of the worm gear, which is preferably in the form of a fixed bearing and a roller bearing.

Fixing of the bearing on the bearing seat of the worm gear is preferably effected by way of an entrainment disc welded to the rear end of the spindle in material-bonded relationship. In addition at least one connection comprising a projection and a recess on the worm gear and the entrainment disc provides for a non-rotatable connection between the entrainment disc and the worm gear. Preferably there are provided a plurality of recesses into which corresponding projections engage, in particular two diametrally opposite pairs comprising a recess and a projection. The securing disc therefore secures the rear bearing axially on the bearing seat and in addition represents the non-rotatable connection between the steel spindle and the worm gear which is preferably made from plastic.

In the state of the art that flange guide arrangement or profiling has play on all sides relative to each other. Depending on the respective operating point and the operating situation of the linear drive, caused by that play, unpleasant noise occurs in particular upon a reversal in the direction of the spindle. A reduction in the play is relatively costly from the point of view of production technology because then particular tolerances have to be taken into consideration and are therefore too expensive.

A preferred development, for avoiding that noise, provides that the flange guide, that is to say the tongue-and-groove connection for non-rotational axial guidance of the spindle nut in relation to the stationary guide tube is at least portion-wise of a resilient nature. That is preferably effected by the spindle nut which is preferably formed from plastic including at least one spring portion or by the spindle nut at its outer peripheral surface having a profiled portion into which engage the inner ribs which are correspondingly provided on the guide tube. The use of the resiliently flexible portions always provides an adequate prestressing of at least one and preferably a plurality of flange guides provided between the surrounding guide tube and the spindle nut.

The man skilled in the art will appreciate that that spring-biased linear guide arrangement for reducing noise does not necessarily have to be combined with the ship profile for automatically correct orientation of the spindle nut relative to the guide tube, but rather can also be implemented independently of the ship profile. In that respect protection is also claimed independently for the spring-biased linear guide arrangement. The combination of the spring-biased linear guide arrangement with the ship profiles or a linear drive does however represent the particularly preferred design configuration.

Further features and advantages of the invention will be apparent from the specific description hereinafter of preferred embodiments with reference to the accompanying drawings. In this respect directional terminology like for example "upward", "downward", "forward", "rearward", "front", "rear" and so forth is used in relation to the orientations of the Figure or Figures being described. As components of embodiments can be positioned in a number of differing orientations the directional terminology serves for illustration and is in no way limiting. It will be appreciated that other embodiments can be used and structural or logical modifications can be made without thereby departing from the scope of protection of the present invention. The following detailed description is not to be interpreted in a limiting sense. In the context of this description the terms "connected", "joined" and "integrated" are used to describe both a direct and also an indirect connection, a direct or indirect join or direct or indirect integration. Identical or similar components are denoted by identical references in the Figures insofar as that is desirable. The views in the Figures are substantially true to scale. However certain regions can be shown on an enlarged scale as will be apparent to the man skilled in the art to illustrate details. In addition the drawings can be strikingly simplified and do not contain every detail which is possibly present in a practical implementation.

As components of embodiments can be positioned in a number of differing orientations the directional terminology serves for illustration and is in no way limiting. It will be appreciated that other embodiments can be used and structural or logical modifications can be made without thereby departing from the scope of protection of the present invention.

The following detailed description is not to be interpreted in a limiting sense. In the context of this description the terms "connected", "joined" and "integrated" are used to describe both a direct and also an indirect connection, a direct or indirect join and direct or indirect integration.

Unless otherwise specified the indefinite article and the definite article refer not just to an individual component but are to be interpreted as "at least one". The terminology includes the above-mentioned words, deviations therefrom and similar meanings. It should further be appreciated that the terms "approximately", "substantially" and similar terms in connection with the dimensions and a property of a component of the invention describe the described dimension and property not as a strict limit or parameter and do not exclude minor deviations therefrom, that are functionally similar. At least parts of description with numerical parameters also include variations in those parameters in accordance with mathematical and manufacturing principles in the state of the art, for example roundings, deviations and other systematic errors, manufacturing tolerances and so forth.

BRIEF DESCRIPTION OF THE DRAWINGS

Finally in relation to a plurality of identical components or elements, for reasons of clarity, only a respective one is denoted by a reference numeral.

In the drawings:

FIG. 5 shows an alternative embodiment of the linear drive with an attachment ring fitted on to the rear end of the guide tube, with a ship profile, FIG. 6 shows an isometric front view of the guide tube with attachment ring removed.

DETAILED DESCRIPTION

Figure 1:
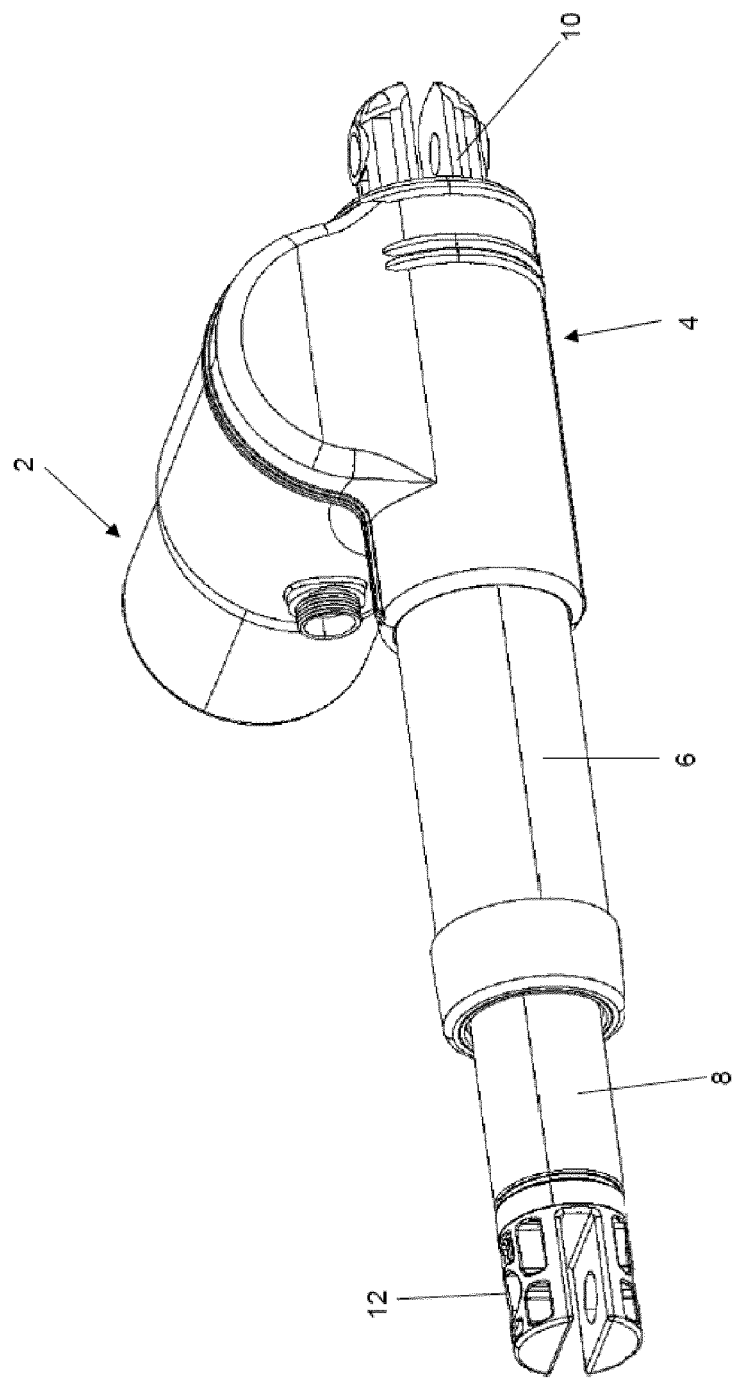
FIG. 1 shows a perspective front view of a linear transmission or linear drive according to the invention.
Figure 2:
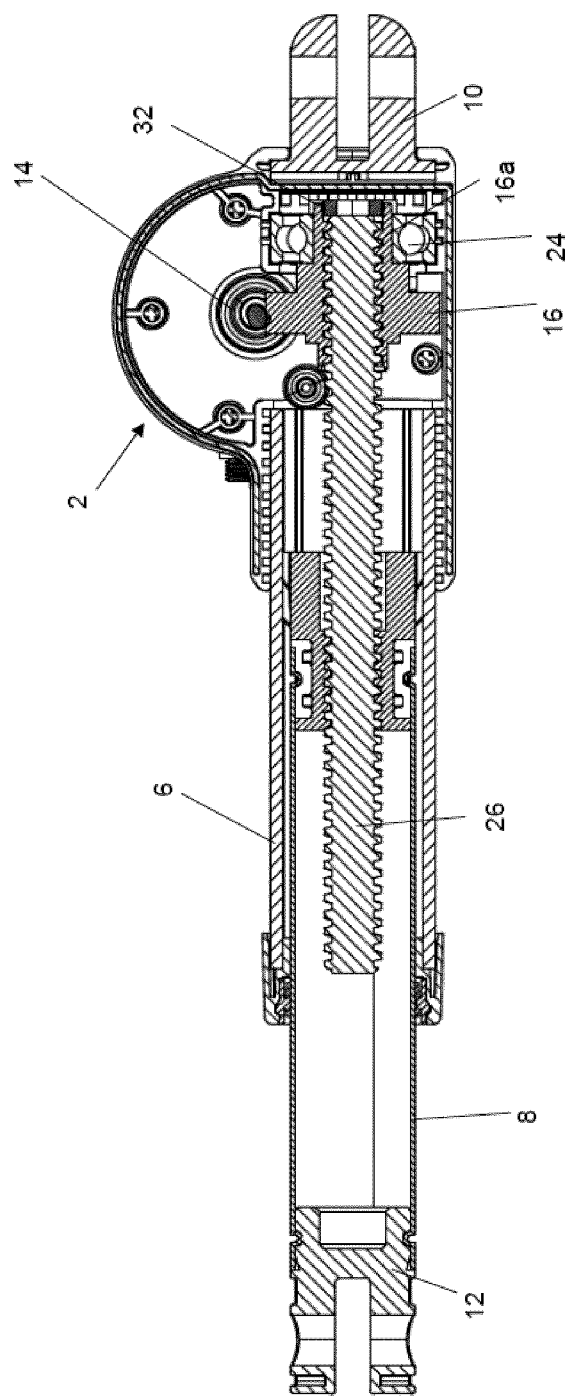
FIG. 2 shows a longitudinal section through a linear drive.

Accordingly the linear drive shown in its entirety in FIGS. 1 and 2 substantially comprises a motor accommodated in a motor housing 2 extending transversely to a transmission housing 4 in which there is accommodated at a front end a guide tube 6 in which in turn a lift tube 8 is relatively moveably accommodated. A rear fork head 12 is fitted into the rear end of the transmission housing 4 and a front fork head 12 is fixed to the front end of the lift tube 8. By way of that fork head 10, 12, the linear drive is fixed for example between the underside frame of a bed and a pivotable frame portion to be adjusted, for example a head or foot portion, or it is secured with struts which can thus be adjusted relative to each other by the lift tube 8 being extended from and retracted again into the guide tube 6.

FIG. 1 shows the linear drive with the lift tube 8 partially extended. Adjustment of the lift tube 8 is effected by way of the electric motor which is accommodated in the motor housing 2 and which drives a shaft with a worm 14 arranged at the end thereof, the worm 14 in turn meshing with a worm gear 16 in known fashion. A spindle 18 on which a spindle nut 20 runs is either fitted directly into that worm gear 16 or is connected to the worm gear 16 by way of a spindle nut.

Referring to FIG. 2 the worm gear 16 at a rear side remote from the lift tube 8 has a bearing seat 16a on which the inner race of a bearing 24 sits, the outer race thereof being accommodated in the surrounding transmission housing 2. That bearing 24 which is in the form of a fixed bearing can thus represent the single bearing for supporting the spindle 26 with the worm gear 16 in the transmission housing.

The bearing 24 is fixed by way of an entrainment disc 32 which is welded to the rear end of the spindle in material-bonded relationship and the outside diameter of which is larger than the outside diameter of the spindle 26 and the bearing seat 16a. In the outer peripheral surface in diametrally opposite relationship the entrainment disc 32 has two recesses, into which two pin-like prolongations at the rear end of the bearing seat 16a engage and thus provide the non-rotatable connection between the spindle 26 and the worm gear 16, which provides for fixing of the rear bearing.

Figure 3:
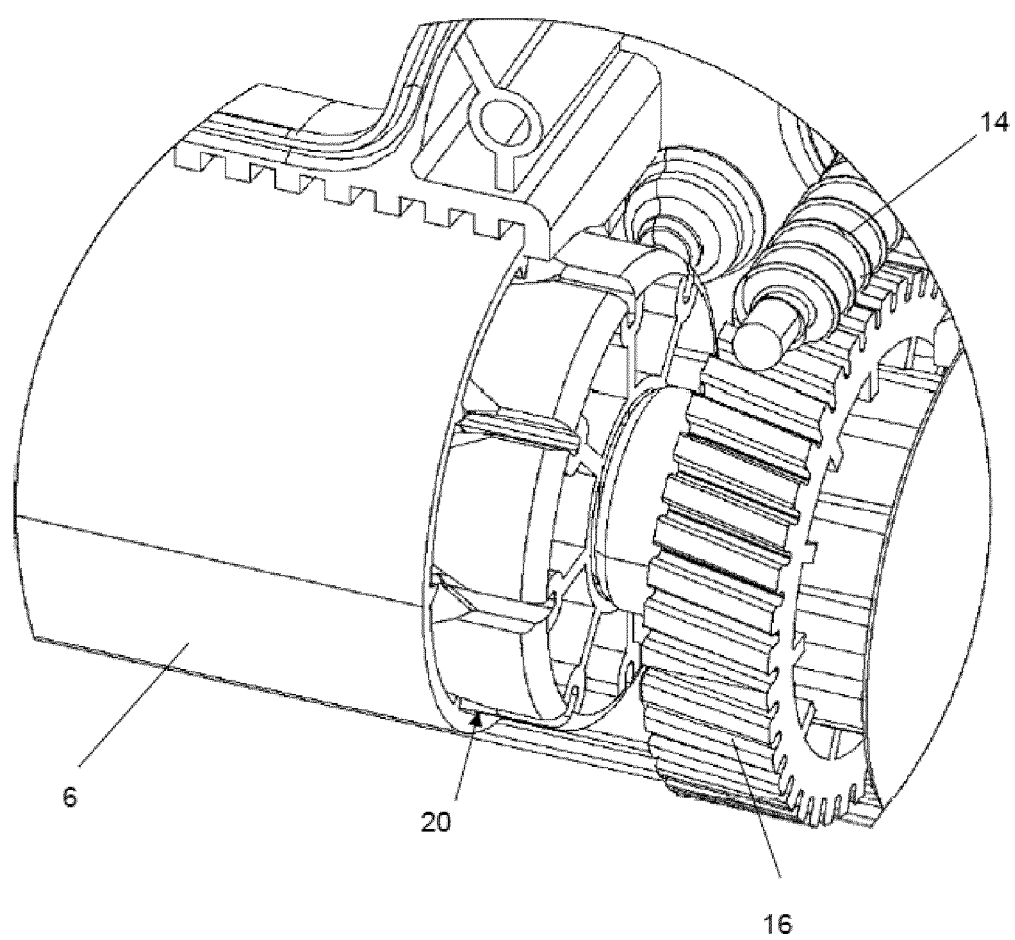
FIG. 3 shows an enlarged isometric detail view of the spindle nut fitted at the end into the guide tube in the housing.
Figure 4:
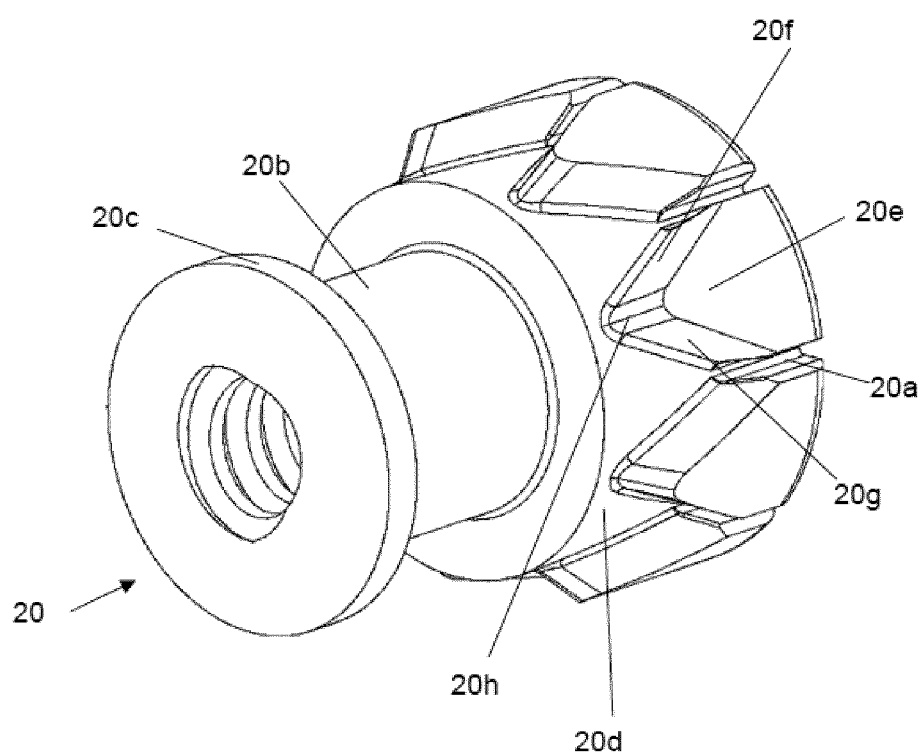
FIG. 4 shows an enlarged isometric front view of a first embodiment of the spindle nut.

Actuation of the worm 14 by way of the electric motor thus produces rotation of the worm gear 16 and the spindle 18 non-rotatably accommodated therein, whereby the spindle nut 20 which has a complementary female thread on the spindle 18 is displaced within the stationary guide tube 6 from a rear retraction end shown on an enlarged scale in FIG. 3 to a front extension end shown in FIG. 1.

The transmission in itself is only at the margin of the subject-matter of this invention. What is essential to the invention is the design configuration of the spindle nut 20 which can best be seen in FIGS. 5 and 6.

Referring to FIG. 5 this shows the assembly process involving insertion of the spindle nut 20 into the guide tube 6, as can be effected by an assembly operative or also a robot.

To provide for correct flange guidance, that is to say arranging the spindle nut 20 in the guide tube 6, that spindle nut 20 has to be oriented at a given rotary angle about the longitudinal axis of the spindle or the spindle nut 20 so that those guide grooves 20a provided at the rear end of the spindle nut 20, in the installed position, correctly align with the inner bars or lands 6a which are provided on the inside on the guide tube and project radially inwardly. For the sake of simplicity only one respective guide groove 20a and inner bar 6a is provided with references although that is peripherally provided in a plurality thereof.

The spindle nut 20 has a cylindrical main body 20b provided at a front insertion end with a radially enlarged, circular-cylindrical insertion collar 20c. Provided internally on the cylindrical main body 20b is a female thread which is complementary to the thread on the respective spindle 18 or the male thread of that spindle 18. At the rear end the spindle nut 20 transitions from that central cylindrical main body 20b in a radially enlarging fashion into a rear insertion portion 20d having an outer cylindrical peripheral surface corresponding in the outer periphery approximately to that of the insertion collar 20c. Provided externally on that insertion portion 20d peripherally spaced at regular intervals are the introduction profiles which are in the form of ship profiles 20e, or they extend radially outwardly from that insertion portion 20d. Of those ship profiles 20e a total of eight are peripherally uniformly spaced from each other on the insertion portion 20d and arranged separated by guide grooves 20a, in the present case being formed in one piece externally thereon.

Accordingly provided between each two adjoining ship profiles 20e is a guide groove 20a which therefore forms a linear region of approximately a third of the length of the front-end ship profile 20e.

In the plan view therefore the ship profiles substantially involve the geometry of an isosceles triangle at least at a front insertion region, in which case the insertion surfaces 20f, 20g extend from the front edge 20h in an isosceles configuration to the guide grooves 20a formed at both sides by the respective ship profile.

To simplify insertion the ship profiles are inclined extending radially outwardly rearwardly in opposite relationship to the insertion direction so that therefore the front edge 20h is inclined rearwardly.

In the first embodiment shown in FIGS. 1 through 4 the ship profiles 20 are formed at the rear end of the spindle nut 22, whose guide grooves 20a at the inner peripheral surface cooperate with or engage into the radially inwardly projecting inner bars 6a at the inside of the guide tube 6.

As the following Figures show the positional orientation means operative when fitting the spindle nut into the guide groove can also be of a different configuration. Thus it is also in accordance with the invention that the positional orientation means are provided at the inner wall of the transmission housing adjoining the end of the guide tube, that projects into the transmission housing, so that therefore a spindle nut inserted into the guide tube by an automatic machine, robot or the like is correctly oriented by the insertion profiles provided internally on the housing, that is to say the inner bars at the inside of the guide tube engage into the guide grooves of the spindle nut.

In the embodiment shown in FIGS. 5 and 6 the ship profile is formed on an attachment ring 28 which can be fitted on to the rear end of the guide tube 6, that projects into the transmission housing. In the installed position therefore the attachment ring 28 bears with an inner surface against the outer end face of the guide tube 6. Four insertion bars 28a are provided in peripherally mutually spaced relationship by the attachment plane which is defined by that attachment ring 28 and which thus extends transversely relative to the longitudinal axis of the guide tube 6, the insertion bars 28a extending in a first direction transversely to the attachment plane defined by the attachment ring 28. Those insertion bars 28a engage when inserted into the guide tube 6 between two adjoining, radially inwardly projecting inner bars 6a within the guide tube 6. In the opposite direction to the insertion bars 28a at least one ship profile 28b also extends transversely relative to the attachment plane of the attachment ring 28, which profile 28b upon insertion of the spindle nut 30 engages between outer bars 30b which are provided at the outer peripheral surface of the rear cylindrical insertion portion 30a and which are peripherally spaced from each other forming intermediate spaces. That spindle nut 30 also includes a hollow-cylindrical main body 30c, with at the front end thereof a radially enlarged insertion collar 30d while at the rear end thereof there is the cylindrical insertion portion 30a with the radially projecting and mutually spaced outer bars 30b, wherein in the present case they are provided in cross-wise relationship in diametrally opposite positions.

Figure 7:
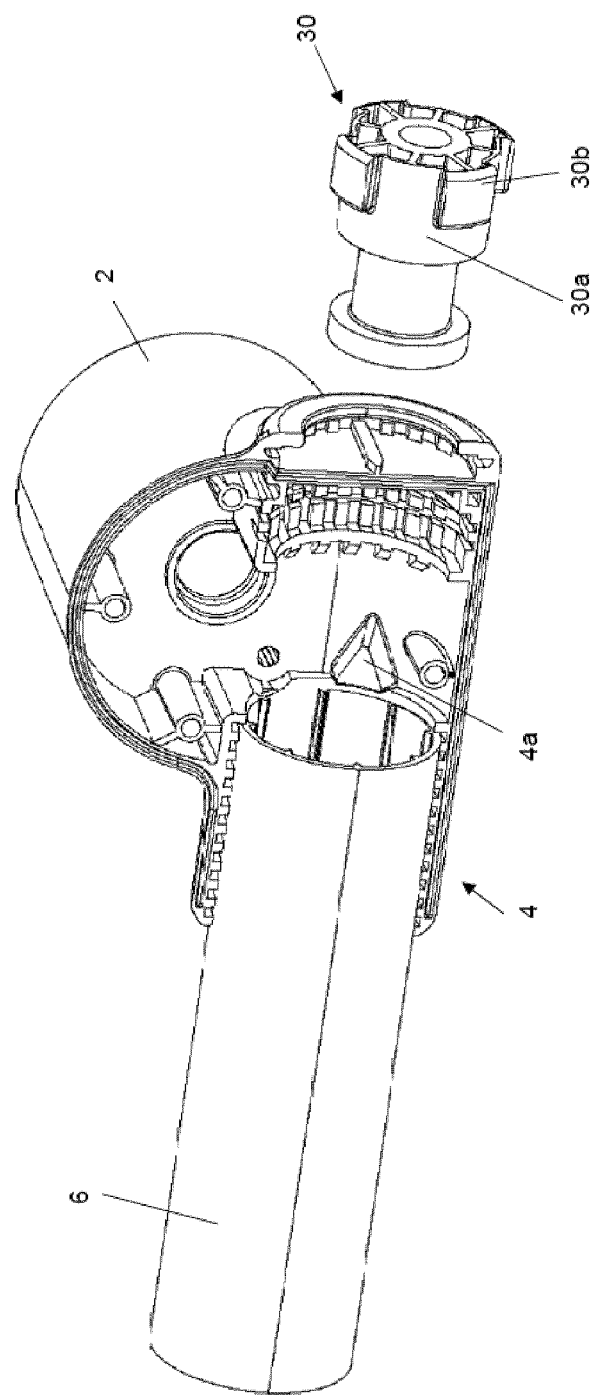
FIG. 7 shows an alternative embodiment of the linear drive with the ship profiles provided at the inside of the transmission housing.

In the embodiment shown in FIG. 7 in contrast the ship profile 4a serving as an orientation aid is provided at the inner peripheral surface of the transmission housing 4, preferably being formed in one piece thereon. That can also include a plurality of ship profiles 4a for forming a ship structure, and upon assembly with the spindle nut 30 they cooperate with the guide bars 30b which project radially externally on the rear cylindrical insertion portion 30a.

It is to be noted that the spindle nut 30 can be inserted into the transmission housing 4 not only from the rear but also laterally, for example if the transmission housing 4 is closed at the rear end and outside of a rear wall has a peripheral insertion edge 40b, into which the peripherally extending edge at the outside of the rear fork head 10 can be inserted.

FIGS. 8 through 11 show various views and arrangements of a spindle nut 40 which, to avoid noise upon the reversal in direction, include a resilient linear guide, that is to say the pairing between the bars 6a and the guide grooves 40a.

Figure 8:
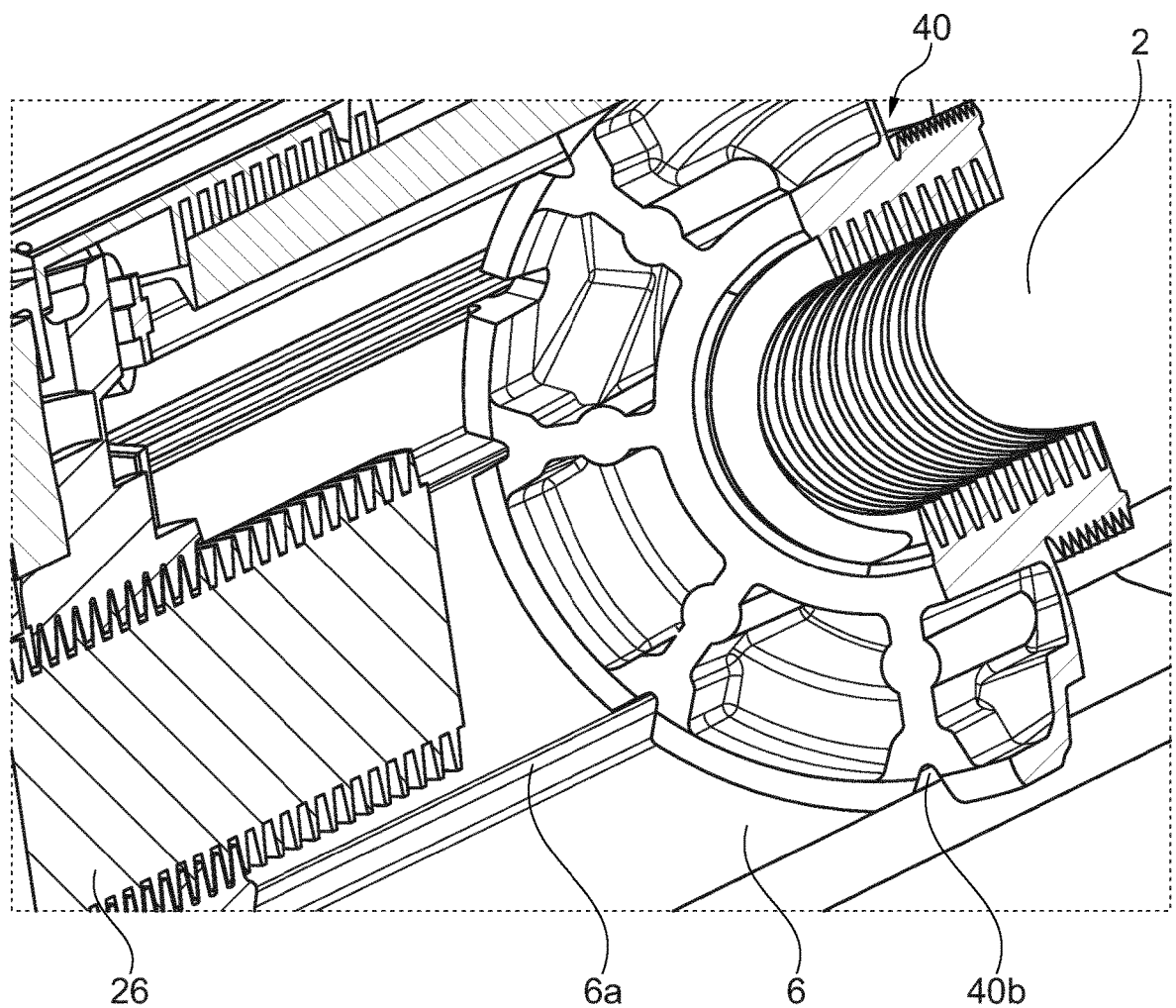
FIG. 8 shows an enlarged isometric front view of the spindle nut released from the spindle to show the sprung flange guide.

In that respect FIG. 8 shows an enlarged isometric longitudinal section through the linear drive with the spindle 26 removed from the spindle nut 40 for better illustration of the resilient flange guide arrangement. Provided in peripherally spaced relationship at the inner peripheral surface of the guide tube 6 are inner bars 6a which taper towards the central longitudinal axis of the guide tube and which in cross-section form a triangular profile projecting with the tip into the interior of the guide tube. Provided in corresponding relationship with those inner bars 6a at the outer cylindrical peripheral surface of the spindle nut 40 spaced relative to the spacings of the inner bars 6a are guide grooves 40a into which engage the inner bars 6a which are therefore correspondingly also triangular in longitudinal section in complementary fashion with the geometry of the inner bars.

Figure 9:
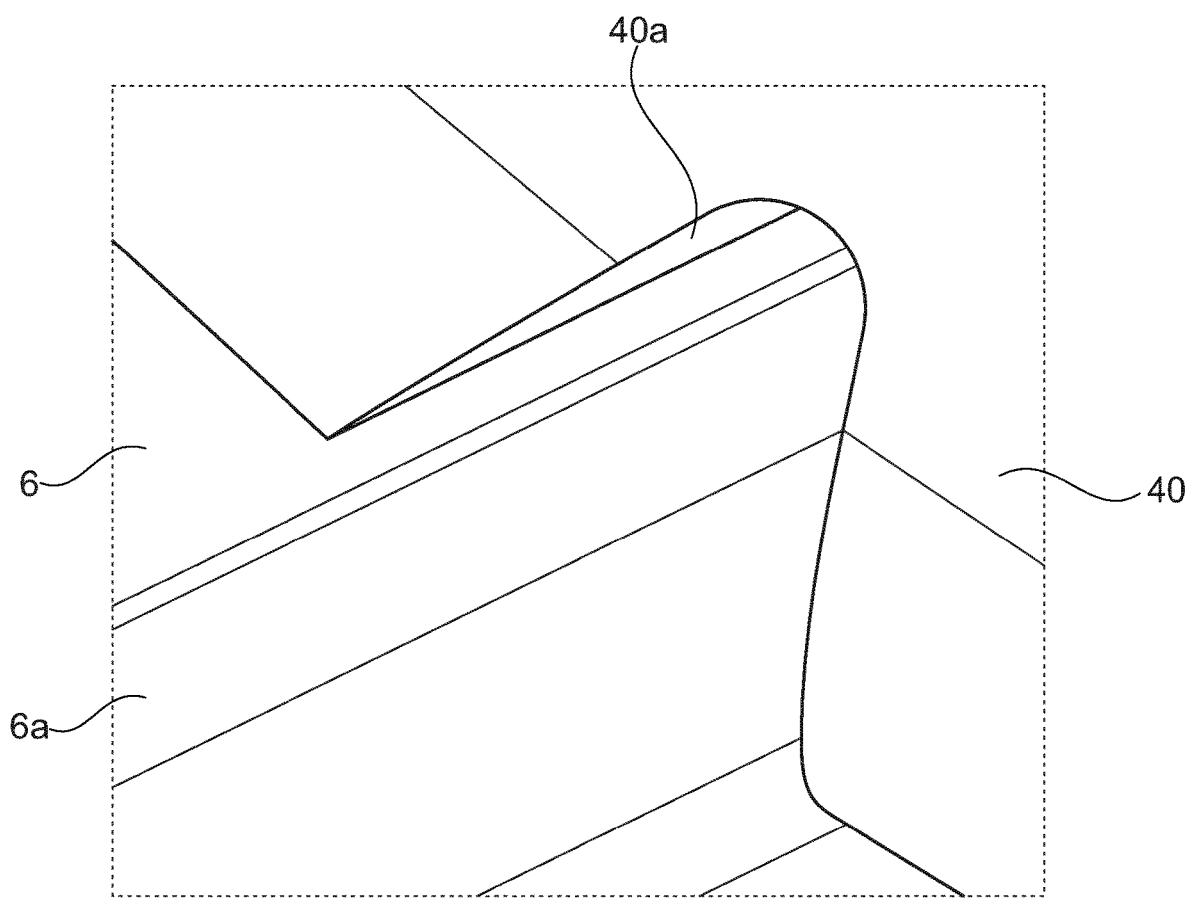
FIG. 9 shows an enlarged isometric front view of a flange guide to illustrate the play which occurs.
Figure 10:
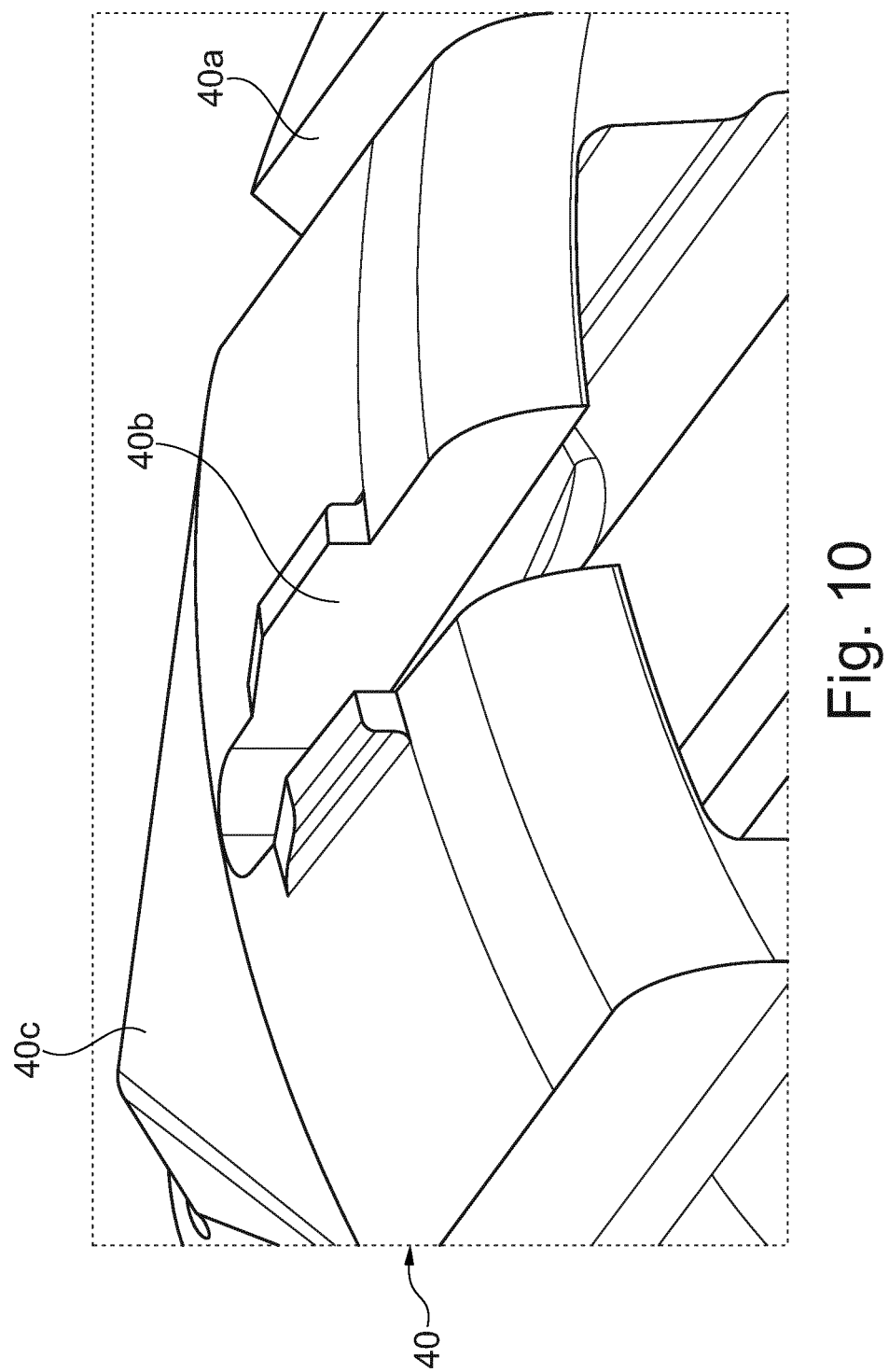
FIG. 10 shows an enlarged isometric rear view of a portion to illustrate the resilient configuration of the spindle nut.
Figure 11:
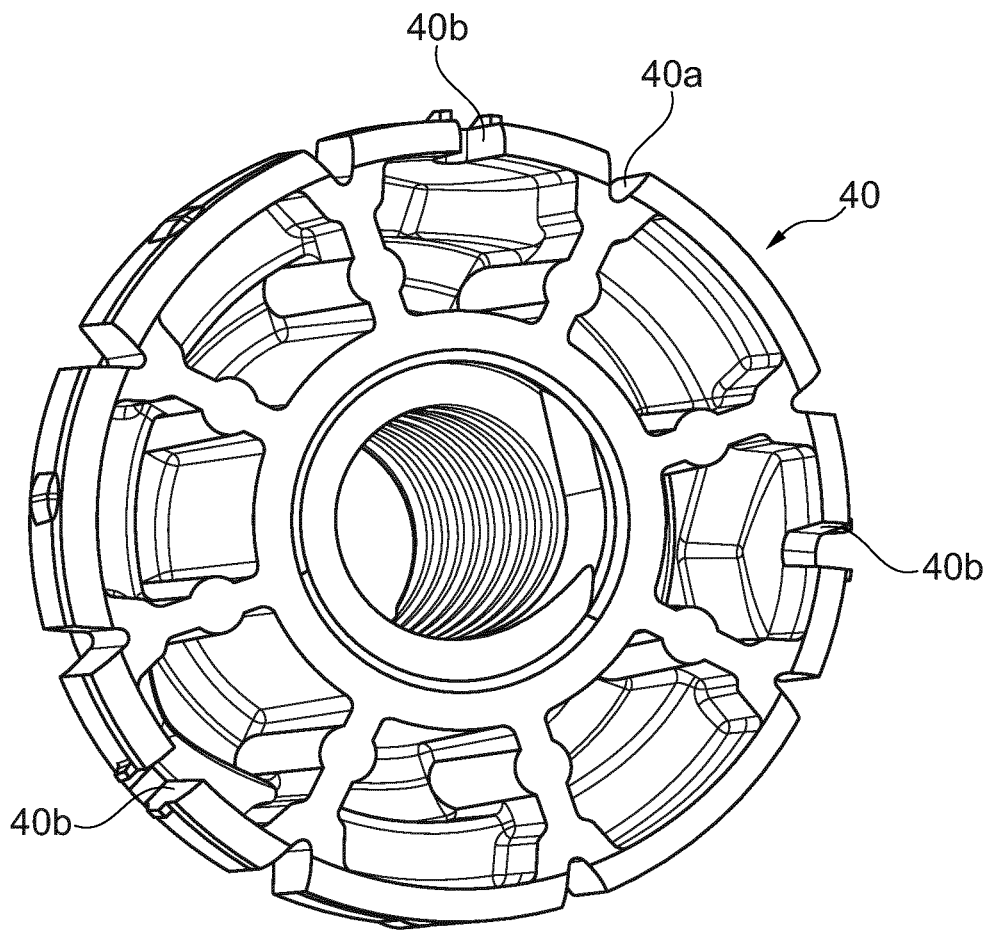
FIG. 11 shows an isometric rear view of a resilient spindle nut.

To give the least possible restraint, that is to say to make the movement as easy as possible, there is a play between the linear guides by the guide grooves 40a being somewhat wider than the outside geometry of the inner bar 6a, which is clearly apparent from the enlarged isometric front view of a linear guide in FIG. 9. That play however can precisely cause the unwanted noise upon a change in direction of the linear motor, because the inner flank of the guide groove 40a, which in FIG. 9 bears at the right-hand side against the outer surface of the inner bar 6a, comes out of engagement upon a change in direction and instead the opposite flank which is at the left-hand side in FIG. 9 strikes against the opposite outer flank of the inner bar 6a. To avoid such impacts the peripheral surface of the cylindrical outer surface or outer peripheral surface of the spindle nut is provided with three spring grooves 40b which are respectively spaced from each other by about 120° on the peripheral radius, which impart an adequate spring property to the adjoining guide grooves 40a in order to adequately prevent the above-described impact of the lateral flanks of the guide grooves 40a against the inner bars 6a upon a change in direction. That spindle nut is also formed with ship profiles at the front side.

The ship structures formed by the ship profiles together with the struts or inner bars on the joining partners therefore simplify assembly insofar as they so-to-speak permit self-adjusting orientation of the components being connected in the connecting process. The spindle nut therefore only still has to be inserted into the guide groove without in that respect having to pay attention to the correct angular orientation or provide for re-adjustment.

LIST OF REFERENCES 2 motor housing
4 transmission housing
4a ship profile
4b insertion edge
6 guide tube
6a inner bar
8 lift tube
10, 12 fork head
14 worm
16 worm gear
16a bearing seat
20 spindle nut
20a guide groove
20b main body
20c insertion collar
20d insertion portion
20e ship profile
22 spindle nut
24 bearing
26 spindle
28 attachment ring
28a insertion bar
28b ship profile
30 spindle nut
30a insertion portion
30b outer bar
30c main body
30a guide bars
30d insertion collar
32 entrainment disc
40 spindle nut
40a guide groove
40b spring groove
40c ship profile

What is claimed is:
1. A linear drive comprising:
a transmission housing,
an electric motor which is connectable or connected to the transmission housing and which drives a mounted shaft, wherein the shaft drives a worm which in turn meshes with a worm gear which in turn is non-rotatably connected to a spindle on which runs a spindle nut which is arranged non-rotatably and relatively displaceably in a guide tube, wherein the guide tube is arranged with an end in the transmission housing, wherein the spindle nut is connected to a lift tube and wherein provided between the guide tube and the spindle nut for ensuring a correct rotary angle orientation of the spindle nut in relation to the guide tube are inner bars and complementary guide grooves, wherein provided between the spindle nut and the guide tube are positional orientation means which are adapted to provide the correct rotary angle orientation of the spindle nut upon insertion thereof into the guide tube in a push-in direction, and wherein the positional orientation means include at least two mutually spaced insertion profiles which at least at a front end are substantially in a form of ship profiles, that the ship profiles each have a front edge, from which lateral insertion surfaces extend rearwardly, and that at least two mutually adjoining insertion profiles form the guide groove between each other or transition into the guide groove.

2. The linear drive as set forth in claim 1, wherein there are provided a plurality of mutually juxtaposed insertion profiles having respective guide grooves provided between two mutually adjoining insertion profiles.

3. The linear drive as set forth in claim 1, wherein the guide groove includes a linear or straight region.

4. The linear drive as set forth in claim 1, wherein the insertion profiles, in a plan view, are substantially of a geometry of an isosceles triangle.

5. The linear drive as set forth in claim 1, wherein the insertion surfaces are substantially straight.

6. The linear drive as set forth in claim 1, wherein the insertion profiles are inclined in opposite relationship to the push-in direction upwardly and extending rearwardly.

7. The linear drive as set forth in claim 1, wherein the insertion profiles are provided peripherally on a cylindrical peripheral surface of the spindle nut.

8. The linear drive as set forth in claim 1, wherein the insertion profiles are provided at an inside wall of the transmission housing adjoining an end of the guide tube, that projects into the transmission housing.

9. The linear drive as set forth in claim 1, wherein the insertion profiles are formed in one piece on a respective joining partner.

10. The linear drive as set forth in claim 1, wherein the insertion profiles are adapted to be connectable to a respective joining partner.

11. The linear drive as set forth in claim 10, wherein the insertion profiles are provided on an attachment ring which is fittable at an end on to the guide tube.

* * * * *